United States Patent Office 2,809,623
Patented Oct. 15, 1957

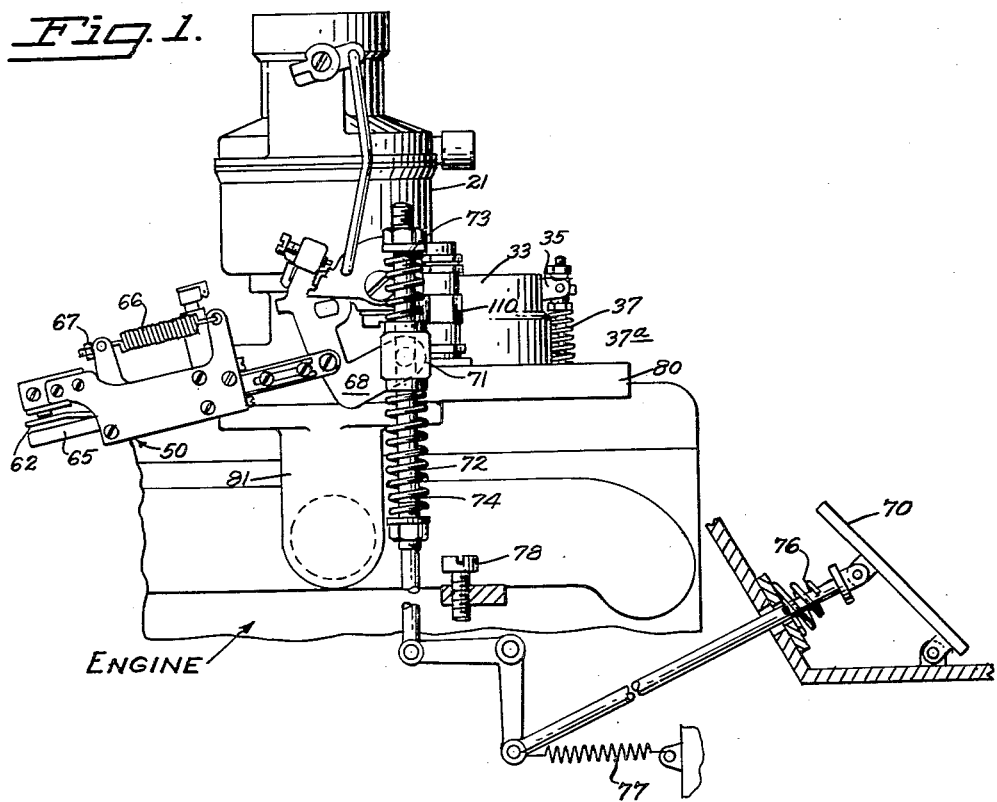

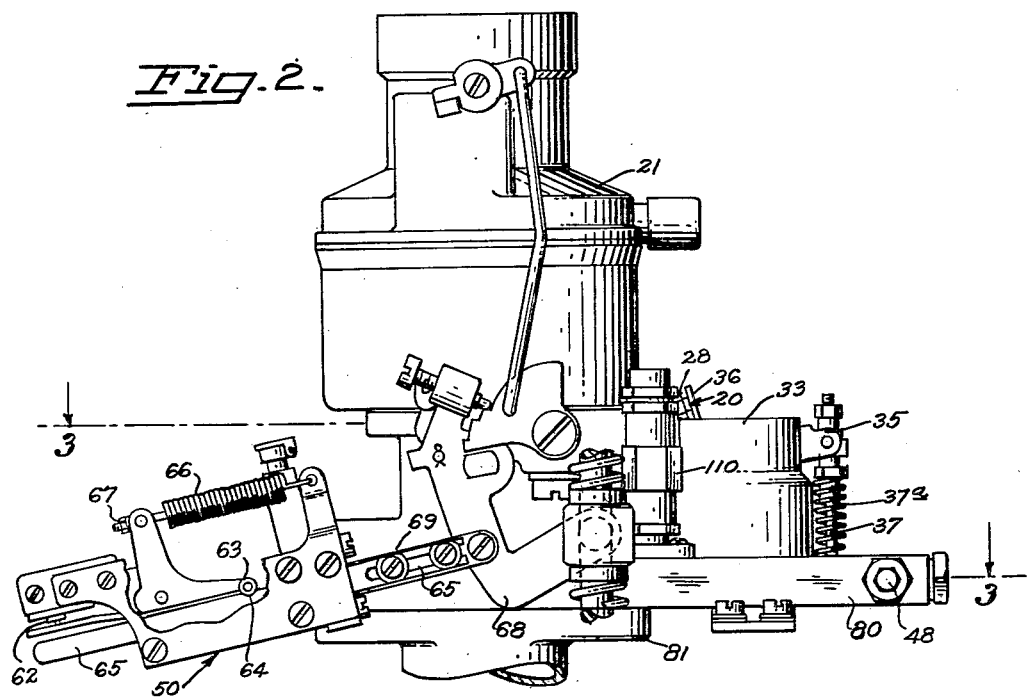
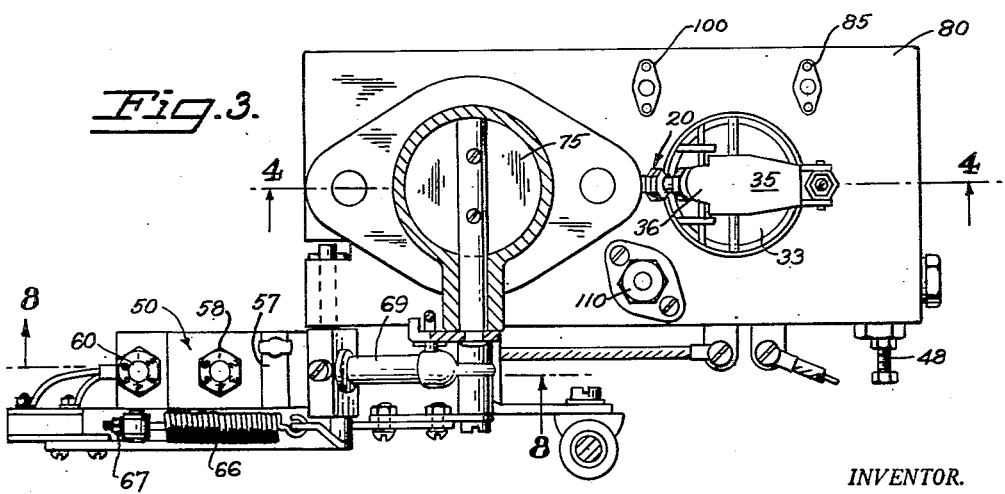

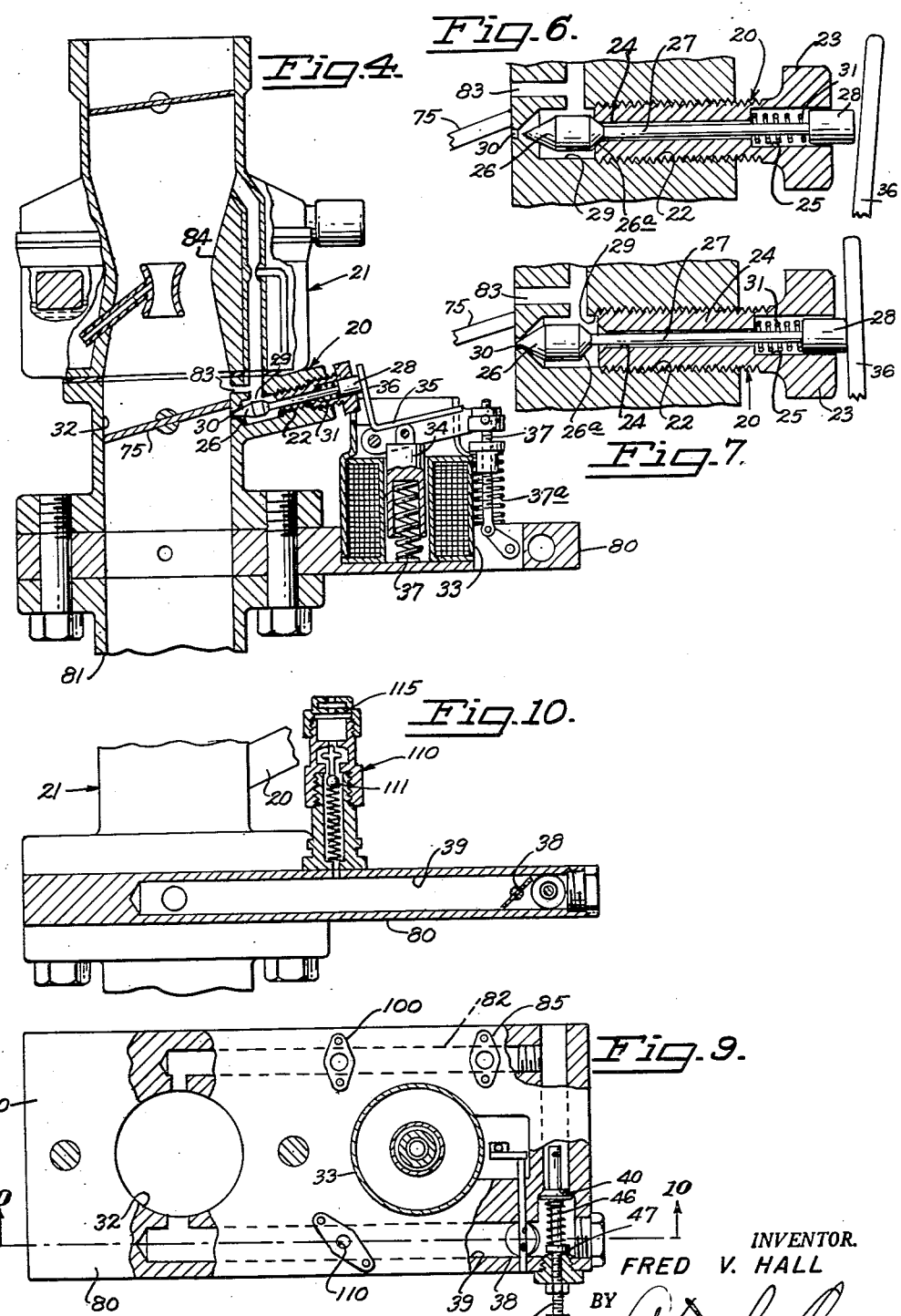

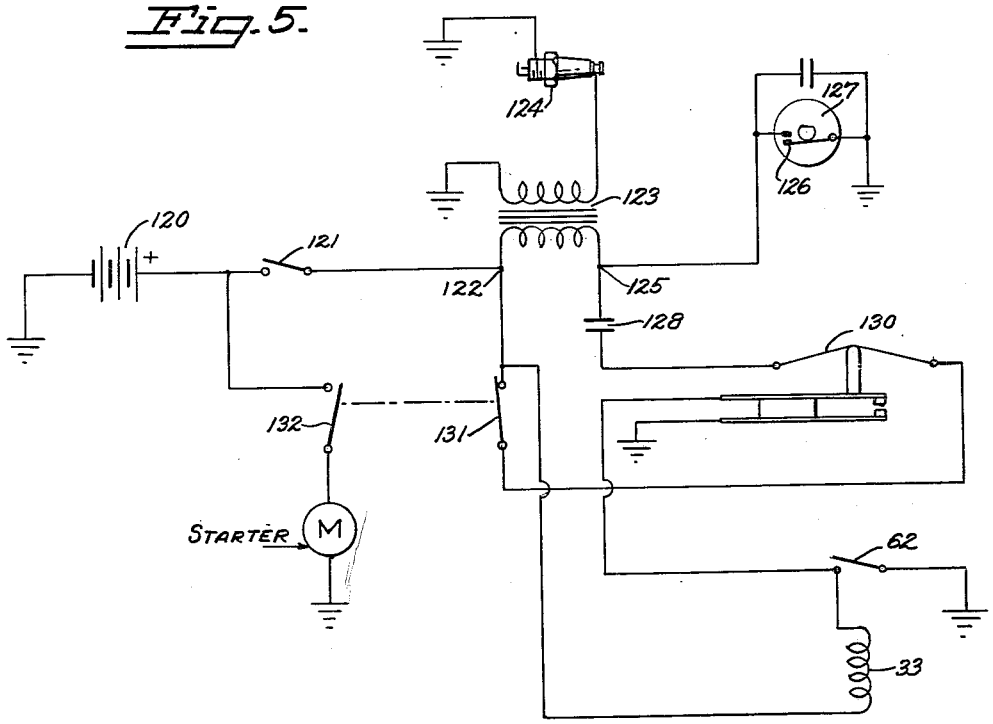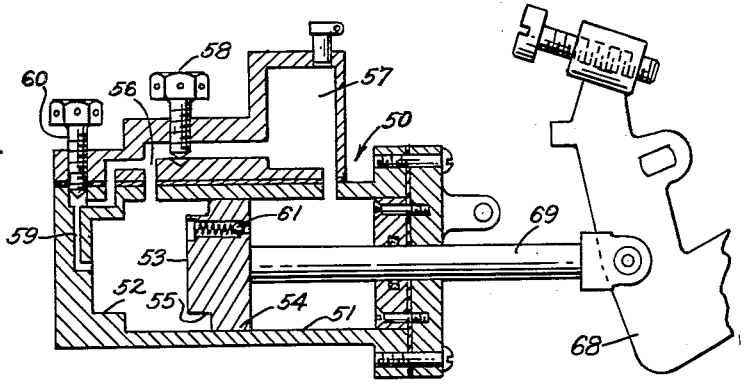

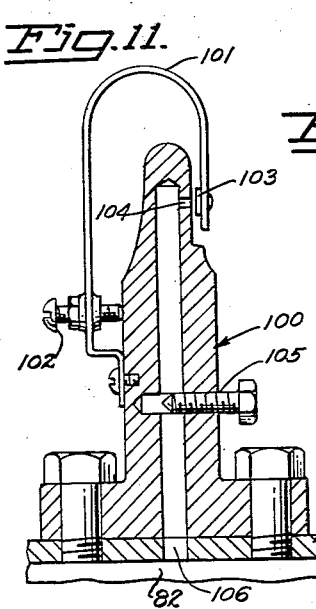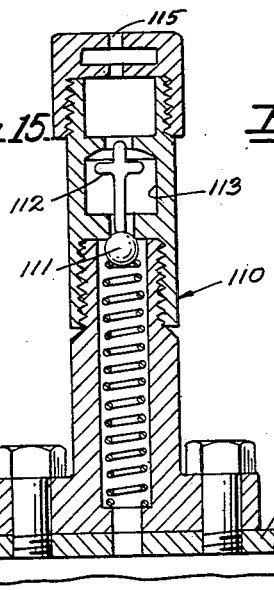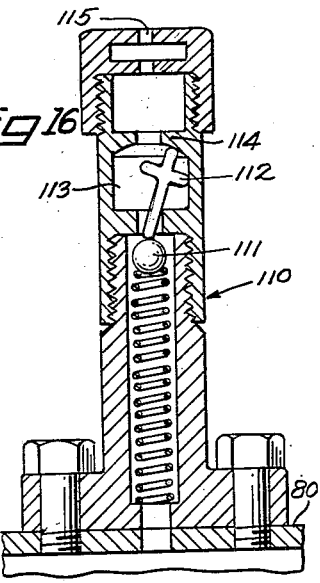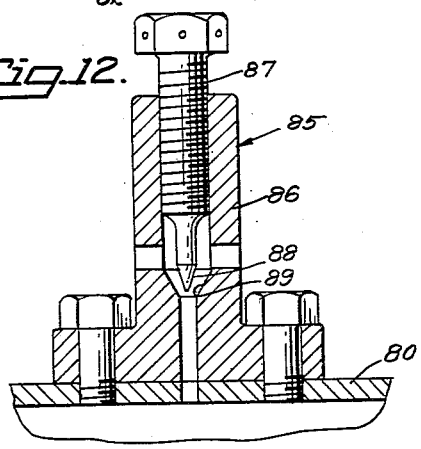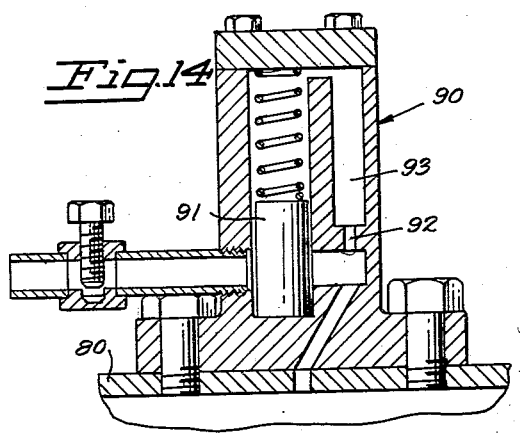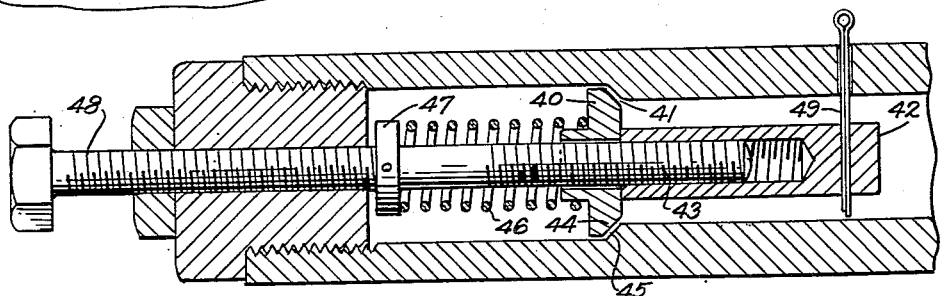

2,809,623

CONTROL DEVICE FOR CARBURETOR-TYPE INTERNAL COMBUSTION ENGINES

Fred V. Hall, San Francisco, Calif.

Application October 1, 1956, Serial No. 613,119

32 Claims. (Cl. 123—179)

This invention relates to a control device for the carburetor and throttle of an automotive vehicle. More particularly, it relates to a control device for obtaining high over-all efficiency in the reduction of the amount of unburned hydrocarbons expelled through gasoline engine exhausts. Since these unburned hydrocarbons are known to be "smog" precursors, the invention may also be described as a device for eliminating from the atmosphere a large proportion of those smog-forming hydrocarbons emitting from automotive vehicles, by direct action on that important source of smog precursors.

In order to fully understand the scope of this invention and how it differs from certain prior-art devices, it is necessary to examine the factors that cause air pollution over urban centers. A significant difference in the modern-day problem of air pollution by smog as contrasted with the age-old smoke-and-fume problem, is the presence now of an entirely new class of air pollutants of extreme toxicity and of an invisible or vaporous nature in certain stages. Many, if not most, of these pollutants have their principal source in the unburned or partially oxidized hydrocarbon-type materials expelled into the atmosphere from the engine exhaust from spark-ignition engines of trucks, busses, and automobiles.

In the atmosphere the heavier hydrocarbons (four carbon atoms or more per molecule) from automotive exhausts tend to enter into photo-chemical reactions with nitrogen oxides issuing both from automotive exhausts and other sources. These reactions result in the formation of ozone and other powerful oxidizing materials which, even in very dilute concentrations, are extremely toxic and extremely reactive. Some of these materials are a thousand or more times as toxic as carbon monoxide, which is generally regarded as very toxic, and they produce physiological (e. g. eye irritation) and phytotoxicological (plant damage) manifestations when in concentrations of only a few parts per hundred million. Elimination of these heavy hydrocarbons from the atmosphere would remove one of the primary reactants and would practically stop the smog-producing reactions.

Gasoline engine exhaust always contains a certain amount of the unburned hydrocarbon material forming these toxic compounds. However, under some conditions the concentration is many times as great as normal. The specific operating conditions conducive to hydrocarbon emission are, in their order of importance, as follows: (1) initial deceleration, (2) overrunning, (3) idling, (4) acceleration, and (5) cruising. The first two of these operating phases—initial deceleration and overrunning—are, by a large factor, responsible for the bulk of hydrocarbon emission from engine exhausts and this invention employs a novel combination that greatly reduces their concentration in the atmosphere and, therefore, their deleterious effects. It also reduces the emission of hydrocarbons from the other phases of engine operation. In fact, one of the main features of this invention is its automatic adaptation to each successive engine operating phase and its overall coordination of carburetor and throttle operation to each phase.

(1) "Initial deceleration" is the period when the throttle is first closed; during this condition the primary source of fuel to the engine is the gasoline that has already been metered and is already present in the manifold by the time the throttle is closed. This fuel, which is already downstream from the carburetor, is therefore not subject to control by idle-mixture cutoff devices. Large quantities of liquid fuel are trapped in the manifold when the throttle is abruptly closed and insufficient air is available for efficient combustion. My invention includes control of this initial deceleration phase by a special combination of throttle damping and auxiliary air bleed.

(2) "Overrunning" is the second phase of the slowing-down process, where the already-metered fuel has been used up and the engine is being supplied fuel principally by the idle-mixture system. Overrunning is therefore subject to control by an idle-mixture cutoff device.

The distinction between initial deceleration and overrunning has been completely overlooked by most observers; yet the distinction is of great importance, because it is not possible to obtain high efficiency by treating them as identical conditions or by ignoring either one of them. My novel combination includes improvements in idle mixture cutoff, throttle damping, and vacuum control and operates and coordinates them in a special cycle to obtain important new and surprising results. Though basic, unimproved elements capable of use in my combination have been employed in "degassers," economizers and other devices for many years, they have not heretofore been coordinated or properly controlled, because they were used only for some limited purpose. Since they have been used independently or aggregatively and since there has been no means for combining and coordinating them, they were incapable of high, over-all efficiency in the reduction of hydrocarbon emission, however good they may have been for their intended purposes. So far as they are concerned, the present invention comprises a novel combination of elements that brings about entirely different effects from the elements and aggregations of the prior art. It also comprises certain novel elements that combine with the basic elements to bring about additional novel results.

(3) The idling cycle, while not considered to be a major source of unburned hydrocarbons, does contribute a significant amount of these pollutants, and this invention also includes devices to reduce this amount and its contribution to smog. Generally speaking, an engine in good condition, properly adjusted, is reasonably efficient under normal idling conditions. However, several additional facts are of great importance when considering the idle cycle in its relation to air pollution. First, idle air-fuel ratios become richer with the passage of time, due to the accumulation of gummy material around the throttle butterfly valve or throttle blade which restricts the idle air supply and enriches the idle air-fuel mixture. Second, because of the high manifold vacuum at idle and low compression pressures, idling conditions are not ideal for complete combustion; therefore small variations in air-fuel ratio cause large variations in combustion efficiency and result in large variations in the emission of unburned hydrocarbons in the exhaust. Third, since smog is produced in photo-chemical reactions induced by sunlight in in the atmosphere between the unburned hydrocarbon and nitrogen oxides, smog is most prevalent on hot days; yet the idle system of an engine is normally adjusted by a mechanic for optimum performance in a garage at normal ambient temperatures, and is not set nor compensated for hot days. Fourth, the temperature under the hood of an automobile on a hot day may be much higher than the outside temperature due to heat transfer from the hot exhaust manifold and other parts, and this high temperature further enriches the idle air-fuel ratio (by reducing the density of the air) to a point where an excessive amount of hydrocarbons and other exhaust combustibles is present in the exhaust effluent. Fifth, less power is required to idle a "hot" engine, due to the reduction in engine friction. Sixth, the original idle air-fuel ratio is set slightly rich at lower ambient temperatures to provide the necessary power for smooth idling. At very high under-hood temperatures, acceptable idle performance is obtainable at considerably leaner air-fuel ratios, which would reduce the amount of unburned hydrocarbons.

This invention solves these problems also. It provides apparatus, automatically brought into action under idling conditions, for maintaining the original idle-air adjustment and at the same time for leaning the idle air-fuel ratio at elevated temperatures. This apparatus is independent of the conventional devices intended to vary the idle air-fuel ratio during warmup. Furthermore, in addition to air-fuel ratio control, this invention includes means for improving idle-mixture distribution.

(4) The acceleration cycle of a spark-ignition engine, while not a great offender in itself from an air-pollution standpoint, does, under certain conditions, contribute significantly to the emission of unburned hydrocarbon in the engine exhaust. In particular, it bears an important relation to the deceleration cycle, since in most instances a deceleration is preceded by an acceleration. This is of great significance in manual gear-shift vehicles, for every gear shift includes a deceleration cycle preceded by an acceleration cycle. Such a pattern always results in a condition of maximum severity during initial deceleration, because the accelerator well of the carburetor may have been emptied into the intake manifold just at the time the air supply is cut off by suddenly closing the throttle. Another condition where the acceleration cycle assumes major importance, because of its relationship to engine operations which follow, is in "throttle pumping," a prevalent type of driving in downtown areas where "stop and go" conditions prevail and where air pollution is particularly objectionable. My invention provides inter-related controls to maintain optimum burning conditions in the engine with the least possible detrimental effect on the over-all driving characteristics of the vehicle in this acceleration-deceleration type of operation. Moreover, optimum burning conditions are provided without hampering the operation of the vehicle.

(5) While cruising does not contribute greatly to the smog problem, most carburetors include means to enrich the air-fuel mixture at or near full throttle to provide more power and better anti-knock performance, and many times this results in over-rich mixtures which are conducive to air pollution. Normally, it would be necessary to change the basic design of the carburetor to eliminate these over-rich full-throttle conditions, however, my invention includes means to discourage or prevent this type of operation, thereby eliminating the necessity of changing the basic carburetor itself.

A general objective of this invention is to provide a complete, integrated system for automatic control in all these phases. A further objective is to provide a system which may be readily installed on existing engines without major difficulty. This is an important consideration in view of the large number of cars already on the road requiring "smog control" devices.

In addition to its main coordinated control system, the invention includes auxiliary devices for operational convenience and other considerations. For example, an "impulse choking" device is included to minimize stalling tendencies inherent in engine-control devices of this type, and the entire system is designed to be self-regulating with respect to need for maintenance.

It should be specifically mentioned that my devices and methods for the reduction of unburned hydrocarbon material in engine exhausts also reduce other unburned materials such as carbon monoxide and hydrogen. Furthermore, by improving combustion generally and by cutting off the fuel under certain conditions, my invention effects an improvement in fuel mileage.

Other objects and advantages of the invention will appear from the following description of a preferred embodiment thereof.

In the drawings:

Fig. 1 is a view in elevation of pertinent portions of an automobile engine, showing especially a carburetor and fuel feed system incorporating a control system embodying the principles of my invention, with the connection to the accelerator pedal shown partly in section and in somewhat diagrammatic fashion and with some connecting links of the throttle lever system broken to conserve space.

Fig. 2 is an enlarged view in elevation of the carburetor of Fig. 1 and control device therefor, the throttle links and a few other parts shown in Fig. 1 having been removed to show the parts behind them and normally obscured by them. A portion of the throttle damping mechanism has been broken away to show the lever linkage therein.

Fig. 3 is a plan view, partly in section, taken along the line 3—3 in Fig. 2.

Fig. 4 is a view in elevation and partly in section along the line 4—4 in Fig. 3.

Fig. 5 is a simplified electrical circuit diagram of an engine ignition system incorporating the principles of my invention.

Fig. 6 is an enlarged view in elevation and in section of the idle mixture cutoff valve of Fig. 4 and some related parts, with the valve shown in open position.

Fig. 7 is a view like Fig. 6 showing the valve in closed position.

Fig. 8 is an enlarged view in elevation and in section of the throttle dashpot arrangement taken along the line 8—8 of Fig. 3.

Fig. 9 is a top plan view, partly cut away and shown in section, of the carburetor flange and some parts carried thereby.

Fig. 10 is an elevational view in section along the line 10—10 in Fig. 9.

Fig. 11 is an enlarged view in elevation and in section of the thermal leaning device, forming part of the combination shown in Fig. 3.

Fig. 12 is an enlarged view in elevation and in section of the idle-air adjustment device shown in Fig. 3.

Fig. 13 is an enlarged view in section of the vacuum control system valve shown in Fig. 9.

Fig. 14 is an enlarged view in elevation and in section of an impulse choking device that may be used to replace the idle-air adjustment device of Fig. 12.

Fig. 15 is an enlarged view in elevation and in section of the failure alarm shown in Fig. 10, here shown in its closed or inactive position.

Fig. 16 is a view similar to Fig. 15 showing the failure alarm in its open position.

Basically this invention: (1) Controls in a definite fashion the rate of throttle closing when the throttle is released during deceleration, by means of a novel special action dashpot 50 (see Figs. 1-3 and 8) which is designed to control throttle changes in their entire range and to additionally damp the final closing motion so that the heavy fuel charge in the manifold is burned before the air supply is completely cut off; (2) completely cuts off the passage of fuel through the carburetor during initial deceleration and overrunning conditions, preferably by a cut off valve 20 (see Figs. 3 and 4) that replaces the normal idle mixture screw in the carburetor; (3) simultaneously prevents the building up of abnormally high vacuums during initial deceleration and overrunning conditions and provides air to burn the fuel charge already in the manifold when the throttle is closed, preferably by means of a special auxiliary butterfly valve 38 and a vacuum control system valve 40 (see Figs. 9 and 10); (4) also controls the rate of throttle opening by a soft link 73, 74 (see Fig. 1), and by a detent 64 and roller 63 construction (see Fig. 2) and discourages but doesn't prevent heavy throttle openings by a hard link 76 (Fig. 1); (5) utilizes a novel special-action dashpot 50 (see Fig. 1) or equivalent damping device to control the throttle changes at all times, which is connected as by an interlock switch 62, to the cutoff valve 20; (6) controls the throttle changes also by hard and soft links 73, 74, 76 (see Fig. 1); (7) supplies idle air through a separate passageway 82 (see Fig. 9) during idling, instead of through the carburetor; (8) in an alternative form, chokes the idle air for an instant at the moment the engine reaches idling conditions, thereby preventing stalling, by means of an impulse choking device 90 (see Fig. 14); (9) leans the idle air-fuel mixture when underhood temperatures are high, by means of a leaning device 100 (see Fig. 3); and (10) provides a failure alarm such as the system 110 (see Fig. 10) to enable use of the combination as a compulsory system.

All these phases and devices are coordinated with each other, as by the throttle linkage (see Fig. 1), the dashpot 50, and an electrical relay system (see Fig. 5). By a positive control system, each portion is brought into operation at the proper time and is rendered inoperative at the proper time. Before describing this over-all control system, it will, however, be necessary to describe the basic elements themselves and their function and operation in the smog-reduction system.

*The idle mixture cutoff valve 20*

An important element of the combination is an idle mixture cutoff valve 20 that is actuated under initial deceleration conditions to stop the passage of fuel from the idle-mixture portion of the carburetor 21. During initial deceleration and overrunning conditions, the engine needs no fuel, because these phases of engine operation are power absorbing rather than power producing, and also because little or no combustion takes place in the engine during those conditions. However, when the idling speed is reached, at the threshold between overrunning and idling, the cutoff valve 20 must open quickly in order to prevent stalling. Thus, the valve 20 must be quick-acting and must be actuated for quick closure when the throttle is closed and be actuated for quick opening at the idling speed.

By way of example, one form of valve 20 and the actuating mechanism therefor are shown in Figs. 4, 6, and 7. The valve 20 may be installed on a conventional carburetor 21 in place of the conventional idle-mixture screw (not shown), which is removed from its threaded socket 22 and discarded. The valve 20 includes a body 23 that is threaded into the socket 22 and has an axial bore 24 opening at its outer end into a wider-diameter portion 25. A valve closure member 26 is mounted at the inner end of a stem 27 that extends through the axial bore 24 and is provided with an enlarged cap portion 28 (which may be a separate piece) at its outer end. The closure member 26 is movable in a passage 29 against a port 30 or away therefrom with adequate clearance in the passage 29 to permit passage of the air-fuel mixture.

A spring 31 normally urges the closure member 26 into an open position for the passage of the air-fuel mixture into the passage 29 and thence through the port 30 into the carburetor passage 32. In this open position the rear end 26a of the closure member is held seated against the body 23, to prevent leakage around the stem 27 and to give adjustment of the idle-mixture metering by varying the position of the body 23 so as to throttle the passage 29 and port 30.

Actuation of the valve 20 is accomplished by a suitable device such as the solenoid 33, shown in Fig. 4, whose core 34 is connected to a bell crank 35, one leg 36 of which engages the valve cap 28.

A spring 37 in the solenoid 33 is much stronger than the spring 31 in the valve 20, and when the solenoid 33 is de-energized, (in a manner to be described) the spring 37 moves the bell crank lever 35 and closes the idle mixture cutoff valve closure member 26 and holds it in the "off" or seated position against the port 30 (Fig. 7). The device is adjusted so that the closure member 26 is held closed at all closed-throttle conditions over approximately 600 R. P. M. It is re-opened when the throttle is opened or when the engine speed drops below a preset level of about 600 R. P. M. How this latter reopening is done will be described in a later section of this description, in connection with the "hot-wire" relay 130 shown in Fig. 5.

The idle mixture cutoff valve 20 is reverse acting, that is, the idle mixture is cut off when the solenoid 33 is de-energized. This is an important part of the self-regulating (maintenance) features which are intended to make the device tamper-proof. If the lead wires to the solenoid 33 are removed, the car will no longer idle, because the idle-mixture will be cut off by the closed valve 20, and so repair is made necessary.

*High vacuum preventer and vacuum limiter (see Figs. 1–4, 9, 10, and 13)*

Another important element of my integrated control system is a vacuum control system that prevents abnormally high vacuums in the manifold and provides a controlled amount of combustion air for completely burning under decelerating or overrunning conditions the last portion of the fuel charge remaining in the manifold when the throttle was closed. The resultant improvement in combustion efficiency reduces the amount of unburned hydrocarbons in the exhaust gas. The vacuum control system also reduces the amount of oil burned because of being pulled into the cylinders by abnormally high vacuum under decelerating or overrunning conditions.

Referring now to Figs. 4, 9 and 10 for an example of a suitable vacuum control system, the bellcrank 35 actuated by the solenoid 33 moves a lever 37 against the pressure of a spring 37a to operate a special butterfly valve 38 which controls the air flow through a passage 39 to the carburetor throat 32 below the main carburetor butterfly valve 75. As can be seen from Fig. 4, the solenoid 33 is so linked that the valve 38 is closed when the idle mixture cutoff valve 20 is open and vice versa.

When the butterfly valve 38 is open, the air flow past it is controlled by a vacuum control system valve 40 shown in Figs. 9 and 13. The valve 40 has two functions, namely, to provide a "fixed orifice" and a spring loaded "relief" to limit the amount of vacuum obtainable. A fixed orifice 41 may be provided by an adjusting nut 42 that may be moved along a threaded stem 43 to hold a valve plunger 44 off its seat 45. The maximum vacuum that can be attained may be limited by a spring 46 seated between the plunger 44 and a collar 47 and whose tension is regulated by an adjusting nut 48. Both the adjusting nuts 42 and 48 operate on threads of the same pitch; therefore the "fixed orifice" adjustment 41 is independent of the vacuum limiter adjustment. A retainer pin 49 is provided through the nut 42 to retain the fixed orifice adjustment at a pre-set value and still allow the vacuum limiter adjustment nut 48 to operate independently. Under most conditions, the "fixed orifice" portion is adequate, but additional air is provided by the spring loaded valve (vacuum limiter) when required for high speed rundowns.

This vacuum control system is not a conventional vacuum "breaker." The vacuum is prevented from building up to excessive values rather than being broken at a high value. Note that the vacuum control system is closed off by the butterfly valve 38 when the valve 20 is open, and when the valve 20 is closed, the valve 38 is simultaneously opened. In addition, the operation of the vacuum control system is co-ordinated with the multiple-function dashpot 50 described below.

*The throttle control system (see Figs. 1–3 and 8)*

My multiple-function throttle-control system utilizes a throttle-damping means, such as a dashpot 50 (or alternatively a metering pin or tapered cylinder) to control the throttle action throughout the range of travel. As discussed previously, idle mixture cutoff cannot affect fuel already metered by the carburetor and present in the manifold. A definite type of throttle-control action is required in order to insure optimum burning conditions for the very considerable amount of this fuel which is present in the initial deceleration stage following a wide-open throttle or after throttle pumping.

On deceleration a spark-ignition internal combustion engine is operated under conditions which are very adverse to efficient combustion. When the throttle valve 75 is abruptly closed, the air supply to the engine is cut off much more rapidly than the fuel supply, because a substantial amount of fuel is in the liquid form traveling along the intake manifold walls in a wet film. This wet film is moving at a much slower velocity than the main air streams and therefore more time is required to use up the fuel in the manifold than is required to cut off the air supply. This causes "loading up" of the engine due to the extremely rich mixture.

This same effect is apparent on acceleration, in which case additional fuel is injected by the accelerator pump, because the air supply would otherwise reach the engine more rapidly than the fuel and cause lean misfiring.

Thus the "inertia" effect of the fuel supply causes overrich mixtures on deceleration and overlean mixture on acceleration unless corrective means are employed. The conventional accelerator pump prevents lean misfiring on acceleration, but normally no controls are provided to correct the over rich condition caused by rapid release of the throttle. The present invention supplies these needed controls.

The deleterious effect of rapid throttle release on efficient combustion can be prevented by releasing the throttle slowly manually, but few drivers will do this, so the present invention supplies a mechanical system with a suitable control such as the dashpot 50. Throttle control directionally has a very adverse effect on the driving characteristics of an automobile. Therefore, to minimize this, the mode of throttle control is regulated to conform to the requirements of the engine for efficient combustion under this transient condition. It is not sufficient just to slow down the throttle action by using a simple dashpot, because the damping characteristics of such a dashpot, being in combination with the throttle return spring provides the least damping during the final closing motion of the throttle just when the most damping is required. In order to match the damping characteristics of the throttle control, this invention provides a two stage damping control, one stage for the main travel and a second much more highly damped stage for the last 5°–10° of throttle valve travel.

In addition to definite closing characteristics a differential action is required on throttle opening, because much less throttle control is required (and is desirable) on throttle opening. The opening characteristics of the throttle control are regulated in this invention by means such as a check valve in the dashpot piston, which modifies the opening characteristics to allow faster, less damped throttle opening. This type of action does not adversely affect the accelerating ability of the car, which is of considerable importance.

The dashpot 50 (see Fig. 8) is provided with a liquid-filled cylinder 51, having an end portion 52 of reduced diameter, and a stepped piston 53 having a larger diameter portion 54 and a smaller diameter portion 55. A passage 56 leads from the cylinder 51 to a surge chamber 57. The damping action on the piston 53 is controlled for most of its travel by a main piston-adjusting screw 58 that regulates the flow in the passage 56. A small bypass passage 59 leads from the narrower cylinder portion 52 to the passage 56, and the final closing movement is regulated by a closing-motion adjusting screw 60. This type of control obtains optimum results with minimum throttle disturbance, and the closing motion, in particular, is considered to be a "criticality." A spring loaded check valve 61 is provided through the piston 53 to give "differential" damping action as less throttle control is required on "tramp down" than on "let up" from a combustion efficiency viewpoint.

An electrical closed-throttle interlock switch 62 for the solenoid 33 is actuated by a roller 63, which when the throttle is closed falls into a detent 64 on a bar 65. A spring 66 and an adjusting nut 67 are provided to adjust the action of the detent-and-throttle-interlock switch 62. A throttle bell crank 68 joins together the bar 64 and a connecting rod 69 from the dashpot piston 53 and connects them to the throttle controls. The switch 62 is open when the roller 63 is in the detent 64 and is otherwise closed. Opening of the switch 62 de-energizes the solenoid 33 (see also Fig. 4). A secondary purpose of the detent 64 is to provide a "snap opening" for the throttle, as there is a tendency for a "flat spot" in acceleration from an idle mixture cutoff condition. In addition, if desired other detents and cams may be provided to prevent operation at any critical throttle position or to lean the mixture at intermediate throttle openings.

*Throttle linkage controls*

Referring now to Fig. 1, the connection between the throttle pedal 70 and the dashpot 50 is shown. A slip joint 71, to which the crank 68 is connected, is preferably provided on a throttle lever 72, so that springs 73 and 74 may control the action of the throttle butterfly 75 in combination with the throttle control dashpot 50. It is possible, therefore, for the dashpot 50 to control both the opening and closing motions of the throttle butterfly 75 independently of the position of the accelerator pedal 70. This prevents excessively rapid opening or closing of the throttle butterfly 75, which is absolutely essential from a combustion efficiency standpoint. The control is "differential" in that different characteristics are employed for the opening and closing movements as dictated by the requirement for optimum combustion efficiency consistent with a reasonably responsive throttle action.

A "hard link" spring 76 may be provided in addition to the conventional throttle return spring 77, to discourage but not prevent heavy throttle openings which, because of their over-rich mixture, are conducive to poor combustion efficiency. A throttle stop 78 (Fig. 1) may be used to prevent completely wide-open throttle positions when necessary.

It will thus be seen that the driver is discouraged, but not prevented, from opening the throttle very rapidly but not to the extent that the accelerating characteristics of the vehicle are adversely affected. Also, when he lets up on the foot pedal 70, the dashpot 50 prevents over-rapid closure of the throttle butterfly valve 75 and closes it in two stages. Upon closure of the valve 75, the interlock switch 62 de-energizes the solenoid 33, closing the idle mixture valve 20 and opening the auxiliary butterfly valve 38 to admit to the manifold a controlled supply of air through the valve 40, for completely burning any fuel still present in the manifold and preventing the building up of a vacuum.

Idle air system (see Figs. 1–4, 9, and 12)

The parts so far described take care of the initial deceleration and overrunning phases. I shall now disclose further elements that increase the combustion efficiency of the engine during the idling stage and revert the idle-mixture cutoff valve 20 and vacuum control system to the proper idling conditions after the overrunning phase has ended.

The vacuum control passageway 39 described above is in a flange plate 80 that is installed between the carburetor 21 and the intake manifold 81 (see Figs. 1, 2, 3, 4, and 9). A separate idle-air passageway 82 is also provided, preferably in the flange plate 80, in order that the throttle butterfly 75 may be completely closed during the idling phase as well as during initial deceleration and overrunning. This is necessary for two reasons: In the first place, it maintains the originally set idle air-fuel ratio by preventing the throttle body from gumming, and secondly, it stops the flow of the fuel mixture from all sources upstream from the primary idle mixture port 30. This is of extreme importance because significant quantities of fuel will otherwise enter the manifold 81 from a secondary idle port 83 or from the main jet venturi 84 and other cavities upstream which are filled with fuel "fog." By completely closing off the throttle butterfly 75 (the conventional idle-speed adjustment being turned to the closed position), all fuel sources from the carburetor 21 are eliminated under decelerating or overrunning conditions.

An idle-air adjustment valve 85 (Fig. 12) controls the separate idle-air supply. The valve 85 may comprise a housing 86, a stem 87 threaded into the housing 86, and a needle valve member 88 at the forward end of the stem 87 and adapted to meter the amount of air entering a passageway 89, whence the air enters the throat 32 below the closed butterfly valve 75.

Alternative or supplement to idle-air valve 85—Impulse choke 90 (Fig. 14)

Figure 14 shows an idle-air impulse choking device 90, which, while not essential like an idle-air valve, is a valuable means for additionally controlling idle air. It may replace the valve 85. This device 90 employs a spring-loaded delayed-action piston valve to "choke" the idle air for an instant at the time the engine slows to idle speed and must be restarted. The purpose of this control is to prevent stalling and not to reduce the hydrocarbon emission. The idle vacuum (approx. 19" Hg) acts on a piston valve 91 through a restriction orifice 92 and the delay cavity 93 to give a delayed opening in the order of 0.1 to 1.0 seconds, which "chokes" the idle air momentarily to effect a quicker restart of the engine. A restart of the engine is required after every action of the basic control mechanism because the intake manifold is "dried up" in order to achieve high efficiency in unburned hydrocarbon control.

Thermal leaning device (Figs. 3 and 11)

Fig. 11 shows the construction of a thermal leaning device 100 which may be mounted on the flange 80 and serve to lean the idle air supply at elevated under-hood temperatures. A bi-metallic element 101 is exposed to ambient under-hood air temperatures and may be adjusted by an adjusting screw 102 to determine the operating temperature at which a pad valve 103 opens to let air in through an orifice 104. The quantity of additional idle air let in may be regulated by an adjusting screw 105, or a standard orifice 104 may be used. The object is to lean the idle air at abnormally high under-hood temperatures. As previously explained, smog occurs on "hot" days, and hot idle air enriches the idle-air mixture. In addition, because the engine friction is low when temperatures are high, it is possible to idle the engine with leaner air fuel ratios. The orifice 104 is made large and the size of the bore 106 so proportioned that not only is the temperature effect compensated, but also the mixture is leaned further to compensate for the lower idling power requirement of the hot engine.

Failure alarm (see Figs. 1–3, 10, 15, and 16)

Where the smog-preventing controls are to be compulsory by law, a failure alarm system 110 (see Figs. 8, 9 and 10) becomes a valuable part of the self-regulation system. The only alternative to such a system is frequent inspection of each vehicle to insure that a smog-control device is operating—a stupendous undertaking where millions of vehicles are involved.

As indicated previously, if the wires to the device are tampered with and disconnected, the spring 37 in the solenoid 33 closes the valve 20, and the engine will not idle. The failure alarm whistle system is provided to give a warning when the device is jammed or fails in the "on" position. In this case the deceleration intake manifold vacuum will reach excessive values (22–26" Hg), and a normally-closed spring loaded check valve 111 (Figs. 10, 15, 16) connected to the passage 39 will open. A locking device 112 then falls into the valve seating area 113 and engages the wall 114 to hold the valve 111 in the open position. With the valve 111 open, a whistle 115 or other alarm is made to sound almost continuously and call attention to the fact that the basic unit has in some manner "failed." Instead of the whistle 115, a large pop-off valve may be provided to admit so much air that the engine will not idle.

The electrical circuit; switch from overrunning to idle (see Fig. 5)

In Fig. 5, a schematic diagram of the electrical circuitry shows a conventional ignition system with some changes made according to the present invention. A storage battery 120 is connected through an ignition switch 121 and a primary lead 122 to a spark coil 123 that fires spark plugs 124, one plug 124 being shown. The other primary lead 125 is returned to ground through breaker points 126 in the distributor 127.

Across the primary circuit of the coil is a coupling condenser 128 in series with a "hot-wire" relay 130. This relay circuit is energized by the pulsating current in the primary circuit, due to the interruption of the breaker points 126. The current through the hot-wire relay 130 is proportional to the rate of breaker-point operation and therefore to speed of the engine. A switch 131 is automatically opened when a starter switch 132 is closed, to disconnect the relay circuit completely during start-up when it is desirable to have all the energy in the coil 123 available for a hot spark for quick starting and when the relay 130 system is not needed, because the idle-mixture solenoid 33 is energized at fast idle by the throttle interlock switch 62 (see also Fig. 8). If desired, amplifying devices may be incorporated into the relay circuit.

The purpose of the "hot wire" relay system is to provide a speed-sensitive switch to re-energize the solenoid 33 and keep it energized at normal idle speed. The points in the hot wire relay 130 are preferably set to close and remain closed below 600 R. P. M. (approximately) and to open and remain open above this speed. This speed interlock re-energizes the solenoid 33, re-establishing the idle-mixture and closing the vacuum control valve 38, so that the engine will idle normally when desired. Alternate speed controls that may be used include switches operating from centrifugal devices, generator voltage, manifold vacuum, oil pressure or any other speed-responsive element—in general, means responsive to engine speed for opening the valve 20 and closing the vacuum control valve 38 when the engine speed drops below a certain predetermined value. If manifold vacuum is relied on, suitable controls interlocking with the throttle position or vacuum control system should be provided,

Operation

When a vehicle incorporating this invention is cruising, and the driver takes his foot off the pedal 70, initial deceleration begins. As the vehicle is decelerated, the throttle dashpot 50 controls the rate of throttle closing in a prescribed manner, increasing sharply the damping rate for the closing movement of the throttle by means of the secondary piston 55. When the throttle closes, the roller 63 drops into the detent 64 on the throttle bar 65, opening the switch 62 which de-energizes the solenoid 33. De-energization of the solenoid 33 closes the idle mixture cutoff valve 20 and simultaneously opens the vacuum control butterfly valve 38, preventing an abnormally high vacuum by admitting a definite amount of air through the fixed orifice 41. If more air is needed, the valve member 44 opens against the pressure of the spring 46 to admit the needed additional air.

As the engine passes through the initial deceleration and overrunning stages and continues to decelerate to lower speeds, it reaches the 600 R. P. M. speed where the idle mixture cutoff valve 20 is reopened and the vacuum control butterfly valve 38 is closed, in order to prevent engine stalling. This is accomplished by the speed interlock consisting of the capacitor 128 and the "hot-wire" relay 130 operated electrically from the primary circuit of the vehicle's ignition system by the rate of opening of the points 126. The speed-sensitive capacitor current actuates the hot wire relay 130 at the preset engine speed of 600 R. P. M. and re-energizes the solenoid 33. The idle mixture cutoff valve 20 is then opened and the vacuum control butterfly valve 38 closed, so that the engine idles normally.

The engine is then idling normally and the solenoid 33 remains energized by means of the speed interlock relay 130. The thermal leaning valve 100 opens at a predetermined temperature in order to lean the idle air-fuel ratio, when the intake air is at elevated temperatures—when "smog" tends to occur. The high temperature enriches the air-fuel ratio by lowering the air density, and the valve 100 leans the mixture to reduce unburned exhaust components. Since the engine is "hot" under these conditions, it also requires less power to "idle" and will idle on leaner mixtures, though it must initially be set richer for normal ambient temperatures. The valve 100 does provide accelerated leaning so as to compensate both for the enrichment of the idle mixture with higher temperatures and the decrease in fuel need by the engine under higher temperatures. This valve 100 does not replace the normal warmup devices (automatic choke, manifold heater, etc.), but operates independently and at elevated ambient (intake air) temperatures only. These temperatures lie well above the ranges where warmup devices are employed. For example, the under-hood temperature on a day when the atmosphere is 100° F. may be above 150° F.

The separate idle air passage 82 makes it possible to close the throttle butterfly 75 completely, so the idle air requirement of the engine may be brought in below the throttle butterfly 75. This allows the carburetor 21 to be completely closed off from the engine in order that no fuel will be supplied from the secondary idle port 83 or any fuel sources farther upstream. In addition, the separate idle air passage prevents "throttle body gumming" which is caused by the impingement separation of airborne particulate matter in the throttle body at the point where the air stream is accelerated to sonic velocities around the edge of the throttle butterfly valve 75. As the throttle butterfly is closed completely and the idle air drawn through passages which do not act as impingement separators, throttle body gumming is eliminated, so that the original idle mixture setting is maintained and the idle mixture does not become richer with time. By maintaining the originally set leaner mixture, hydrocarbon emission from the exhaust is reduced and so is fuel consumption by the engine.

When the driver depresses the pedal 70, the throttle is opened with a "snap action" opening obtained as the roller 63 is forced up by the detent bar 65 which actuates the throttle position interlock switch 62, which also now carries part of the electrical load of the solenoid 33 (a parallel switch circuit), and as the speed increases the speed interlock relay 130 drops out at a predetermined speed above which the solenoid 33 is energized by the switch 62. In the case of rapid depression of the throttle, the "soft link" 71, 72, 73 is compressed due to the damping action of the dashpot 50, and the rate of throttle opening is controlled by the dashpot 50 in a predetermined manner preventing over-rich mixtures. The "soft link" minimizes the effect of "throttle pumping" by the driver which results in over-rich mixtures and excessive emission of unburned exhaust components. As the throttle approaches full throttle position the "hard link" 76 adds resistance to the accelerator pedal 70 to discourage (but not to prevent) full throttle operation with its rich mixtures. In addition, a throttle stop 78, may be used to limit full throttle position.

The device is self-regulating with respect to the need for maintenance. This is accomplished by the "reverse action" solenoid 33 and by the failure warning whistle 110. If the device fails with the electrical power supply "off," the engine won't idle because the mixture is "cut off." If the device fails in the "on" position by sticking or by receiving a continuous uncontrolled electrical power supply then the manifold vacuum will exceed a predetermined value on deceleration; this excess vacuum trips the relief valve 111, which is self-locking, and the whistle 115 continues to "blow" even at lower manifold vacuums.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a control device for a gasoline engine having a carburetor with a throttle valve and throttle means controlling the opening and closing of said throttle valve, the combination therewith of: damping means for said throttle means for damping the opening and closing of said throttle valve; means for introducing to said engine an idle mixture of fuel and air beyond said throttle valve; means for preventing the introduction of said idle mixture by said means to said engine upon closure of said throttle valve and for simultaneously introducing fuel-free air to said engine beyond said throttle valve for burning completely the fuel already beyond said throttle valve when said throttle valve closed and for preventing the build-up of vacuum in said engine; and means actuated at a predetermined low engine speed for reversing said last-named means so as to re-admit said idle-mixture and to cut off said fuel-free air.

2. In a control device for a gasoline engine having a carburetor with a valve controlling the passage of combustible material therethrough and throttle means controlling the opening and closing of said valve, the combination therewith of damping means for said throttle means for damping the action of said valve; normally open means for introducing to said engine an idle mixture of fuel and air beyond said valve; normally energized holding means de-energized after release of said throttle means for cutting off the introduction of said idle mixture to said engine and for simultaneously introducing fuel-free air to said engine beyond said valve for burning completely the fuel already beyond said valve when said valve closed and for preventing the build-up of vacuum in said engine; and means for re-energizing said normally energized means at a predetermined low engine speed while said valve is still closed, so as to re-admit said idle-mixture and to cut off said fuel-free air.

3. In a control device for a gasoline engine having a carburetor with a throttle valve and a throttle lever for opening and closing said throttle valve, the combination therewith of damping means for said throttle lever for damping the closing of said throttle valve and for increasing the damping action just before said throttle valve closes; a conduit from said carburetor to said engine for conducting an idle mixture of fuel and air around said throttle valve; a closure valve for said idle mixture conduit; means for actuating said closure valve upon closure of said throttle valve and for simultaneously introducing fuel-free air to said engine beyond said throttle valve for burning completely the fuel already beyond said throttle valve when said throttle valve closed and for preventing excessive vacuum in said engine; and engine-speed controlled means for reversing said last-named means so as to re-open said idle-mixture conduit closure valve and to cut off admission of said fuel-free air when the engine speed drops below a predetermined value.

4. The device of claim 3 in which said damping means comprises a cylinder and a piston, said cylinder having a main large-diameter portion and a small-diameter portion at one end thereof, said piston being stepped to provide a smaller-diameter portion at the end of a larger-diameter portion to engage in said small-diameter cylinder portion, by-pass means between one end of said large-diameter cylinder portion and the other end, and second by-pass means between said small-diameter cylinder portion and said other end.

5. The device of claim 3 in which the last named means is a hot wire relay connected across the primary circuit of an engine spark coil in series with a condenser.

6. In a control device for a gasoline engine having a carburetor with a throttle valve and a throttle lever for opening and closing said throttle valve, the combination therewith of damping means for said throttle lever for damping the closing of said throttle valve and for increasing the damping action just before said throttle valve closes; a passage from said carburetor to said engine for conducting an idle mixture of fuel and air around said throttle valve; a closure valve for closing said idle mixture passage; a normally energized holding means de-energized upon closure of said throttle valve for closing said closure valve and for simultaneously introducing fuel-free air to said engine beyond said throttle valve for burning completely the fuel already beyond said throttle valve when said throttle valve closed and for preventing excessive vacuum in said engine; and engine-speed controlled means for re-energizing said normally energized means, so as to re-open said idle-mixture passage and to cut off admission of said fuel-free air, when the engine speed drops below a predetermined value.

7. In a control device for a gasoline engine having a carburetor with a throttle valve and a throttle lever for opening and closing said throttle valve, the combination therewith of damping means for said throttle lever for damping the closure of said throttle valve and for increasing the damping action just before said throttle valve closes; a passage from said carburetor to said engine for conducting an idle mixture of fuel and air around said throttle valve; a normally open closure valve for closing said idle mixture passage; conduit means around said throttle valve for introducing fuel-free air to said engine; a normally closed closure valve for said conduit; means for closing said idle-mixture closure valve and opening said closed valve upon closure of said throttle valve for cutting the idle mixture and sending in fuel-free air for burning completely the fuel already beyond said throttle valve when said throttle valve closed and for preventing excessive vacuum in said engine; and engine-speed controlled means for reversing said last-named means so as to re-open said idle-mixture passage and to cut off admission of said fuel-free air when the engine speed drops below a predetermined value.

8. A control device for a gasoline engine having a carburetor with a throttle valve and a throttle lever that opens and closes said throttle valve, comprising a damping mechanism connected to said throttle lever for slowing down closure of said throttle valve; means for closing said throttle valve completely upon release of said throttle lever but after damping of the closure action; means exclusive of said throttle valve for providing an idle mixture of fuel and air during idling of said engine; means for cutting off said idle mixture upon closure of said valve and for simultaneously admitting air beyond said throttle valve for burning completely the fuel already beyond said throttle valve and for preventing excess vacuum in said engine; and means for counteracting said last-named means at a predetermined low engine speed.

9. A control device for a gasoline engine having a carburetor with a throttle valve and a throttle lever that opens and closes said throttle valve, comprising a damping mechanism connected to said throttle lever for slowing down closure of said throttle valve progressively as said valve closes; means for closing said throttle valve completely after release of said throttle lever; a conduit leading from said carburetor to said engine around said throttle valve for providing an idle mixture of fuel and air during idling of said engine; means for shutting off said idle mixture conduit upon closure of said valve and for simultaneously admitting air beyond said throttle valve for burning completely the fuel already beyond said throttle valve and for preventing excess vacuum in said engine; and means for counteracting said last-named means at a predetermined low engine speed.

10. A control device for a gasoline engine having a carburetor with a valve controlling the passage of combustible material therethrough and a throttle lever controlling said valve, comprising the combination of: damping and control means for said throttle lever for damping the opening and closure of said valve, said damping means operating in a specific critical fashion differing during opening from closing, on closing comprising a two-stage control, one stage of lesser force for main throttle travel and a second stage of greater force than the first stage for the final closing movement, and on opening comprising a single stage with less damping force than in either closing stage; means for closing said valve completely upon release of said throttle lever; means for introducing to said engine an idle mixture of fuel and air beyond said valve; means for cutting off said idle mixture upon release of said throttle lever and for simultaneously admitting fuel-free air beyond said valve for burning completely the fuel already beyond said valve and for preventing the build-up of vacuum in said engine; and means for reversing said last-named means so as to admit said idle-mixture and cut-off said fuel-free air at a predetermined low engine speed.

11. A control device for a gasoline engine having a carburetor with a valve controlling the passage of combustible material therethrough and a throttle lever controlling said valve, comprising the combination of: damping and control means for said throttle lever for damping and opening and closure of said valve, said damping means operating in a specific critical fashion differing during opening from closing, on closing comprising a two-stage control, one stage of lesser force for main throttle travel and a second stage of greater force than the first stage for the final closing movement, and on opening comprising a single stage with less damping force than in either closing stage; means for obtaining a controlled snap opening of said throttle lever, for controlling action independent of acceleration pedal; means for increasing acceleration pedal resistance at heavy throttle openings; additional means to prevent full opening of said valve; means for closing said valve completely in damped fashion after release of said throttle lever; means for introducing to said engine an idle mixture of fuel and air beyond said valve; means for cutting off said idle mixture upon closure of said valve and for simultaneously admitting fuel-free air beyond said valve for burning completely the fuel already beyond said valve and for preventing the build-up of vacuum in said engine; and means for reversing said last-named means so as to admit said idle-mixture and cut-off said fuel-free air at a predetermined low engine speed.

12. A control device for a gasoline engine having a carburetor with a valve controlling the passage of combustible material therethrough and a throttle lever controlling said valve, comprising the combination of: damping means for said throttle lever for damping and opening and closure of said valve; means for obtaining a controlled snap opening of said throttle lever for controlling action independent of acceleration pedal; means for increasing acceleration pedal resistance at heavy throttle openings; means for closing said valve completely upon release of said throttle lever; means for introducing to said engine an idle mixture of fuel and air beyond said valve; means for cutting off said idle mixture upon release of said throttle lever and for simultaneously admitting fuel-free air beyond said valve for burning completely the fuel already beyond said valve and for preventing the build-up of vacuum in said engine; and means for reversing said last-named means so as to admit said idle-mixture and cut-off said fuel-free air at a predetermined low engine speed.

13. The device of claim 12 having in addition stop means to limit full opening of said valve by said throttle lever.

14. A control device for a gasoline engine having a carburetor with a butterfly valve controlled by a throttle lever, comprising dashpot-dampened means connected to said throttle lever for slowing the action of said butterfly valve in acceleration and deceleration; means for closing said butterfly valve completely upon release of said throttle lever, after damping; a valve for providing an idle mixture of fuel and air during idling of said engine; electrically actuated means for cutting off said idle mixture energized upon closure of said butterfly valve and for simultaneously opening an auxiliary valve for admitting air beyond said butterfly valve for burning completely the fuel already beyond said butterfly valve and for preventing a vacuum in said engine; and an electrical relay system for de-energizing said electrically actuated means at a speed below a predetermined rate, so that said idle-mixture is again provided to said engine and said auxiliary valve is closed.

15. A control device for a gasoline engine having a carburetor with a butterfly valve controlled by a throttle lever, comprising dashpot-dampened means connected to said throttle lever for slowing the action of said butterfly valve in acceleration and deceleration; means for closing said butterfly valve completely upon release of said throttle lever, after damping; a valve for providing an idle mixture of fuel and air during idling of said engine; means supplying fuel-free air beyond said butterfly valve, the amount of air supplied being determined by the pressure conditions in said engine; an auxiliary valve for admitting additional fuel-free air beyond said butterfly valve; a normally energized solenoid de-energized upon closure of said butterfly valve, for cutting off said idle mixture and for simultaneously opening said auxiliary valve for burning completely the fuel already beyond said butterfly valve and for preventing a vacuum in said engine; and an electrical relay system for energizing said solenoid when the engine speed falls below a predetermined rate, so that said idle-mixture is again provided to said engine and said auxiliary valve is closed.

16. A control device for a gasoline engine carburetor with a throttle-actuated valve controlling the passage of carbureted fuel to said engine, comprising the combination of: means for introducing an idle mixture of fuel and air from said carburetor to said engine beyond said valve; means for cutting off said idle mixture from said engine upon release of said throttle; and means actuated at a predetermined low engine speed for counteracting said cutting-off means so as to readmit said idle mixture to said engine.

17. In a control device for a gasoline engine having a carburetor with a throttle valve and a throttle lever for opening and closing said throttle valve, the combination therewith of damping means for said throttle lever for damping the closing of said throttle valve and for increasing the damping action just before said throttle valve closes; a conduit from said carburetor to said engine for conducting an idle mixture of fuel and air around said throttle valve; a closure valve for said idle mixture conduit; means for actuating said closure valve upon closure of said throttle valve; and engine-speed controlled means for reversing said last-named means so as to re-open said idle-mixture conduit closure valve when the engine speed drops below a predetermined value.

18. An engine throttle system, comprising a carburetor valve, lever means controlling closure of said valve, and damping means connected to said lever means, said damping means upon release of said lever slowing down closure of said valve in two stages, the latter stage being damped more to give slower movement as closure of said valve is approached.

19. The system of claim 18 in which said damping means comprises a cylinder and a piston, said cylinder having a main large-diameter portion and a small-diameter portion at one end thereof, said piston being stepped to provide a smaller-diameter portion at the end of said larger-diameter portion to engage in said small-diameter cylinder portion, by-pass means between one of said larger-diameter cylinder portion and the other end, and second by-pass means between said small-diameter cylinder portion and said other end.

20. The system of claim 18 wherein said damping means controls opening of said valve as well as closing, but by lesser damping force than at any time during closing.

21. The system of claim 18 wherein is provided means for obtaining a controlled snap opening of said lever.

22. The system of claim 18 wherein is provided means for increasing the resistance of movement of said lever at wide throttle valve openings.

23. The system of claim 22 wherein said means comprises an accelerator pedal and a spring engaged only after the pedal has been depressed a certain amount.

24. The system of claim 18 having a connection between said lever and a valve-actuating member comprising a slip joint sleeve connected to said lever and a pair of springs, one on each side of said slip joint.

25. A control device for a gasoline engine carburetor with a valve controlling the passage of fuel and air to the engine, comprising the combination of: a passage for an idle-mixture of fuel and air around said valve; a second valve for closing off said passage; electrically operated means actuated by de-energization upon closure of the first-named valve to close said second valve; and means for re-energizing said electrically operated means in the lower engine speeds to open said second valve.

26. The device of claim 25 wherein said last-named means comprises a relay system connected in parallel with distributor points of a spark plug, said connection being through a condenser.

27. The device of claim 26 wherein there is also starter interlock means to prevent said relay system from operating when the engine starter is being used.

28. An engine-speed-responsive control for an engine with a spark coil and distributor points, comprising a hot wire relay connected to one side of said coil through a condenser, and adapted to close a switch at a predetermined engine speed.

29. The device of claim 15 having thermally responsive means for adding additional fuel-free air at increased temperatures in the atmosphere immediately adjacent the engine.

30. The device of claim 15 with means for momentarily choking the throttle by diminishing the air supply for a brief time at the time said solenoid is energized by the engine speed falling below said predetermined rate.

31. The device of claim 30 wherein the momentary choking means comprises a manifold-vacuum-operated spring-urged piston valve.

32. The device of claim 15 having means responsive to a predetermined manifold vacuum for giving a warning when said vacuum exceeds a predetermined value.

References Cited in the file of this patent

UNITED STATES PATENTS

| | | |
|---|---|---|
| 1,970,002 | Ericsson | Aug. 14, 1934 |
| 2,212,936 | Hoof | Aug. 27, 1940 |
| 2,386,340 | Olson | Oct. 9, 1945 |
| 2,695,366 | Coffey | Nov. 23, 1954 |
| 2,749,894 | Sarite et al. | June 12, 1956 |